United States Patent
Guerrero et al.

(10) Patent No.: US 11,884,601 B2
(45) Date of Patent: Jan. 30, 2024

(54) STRENGTH ENHANCER FOR CONCRETES BASED ON FUNCTIONALIZED NANOMATERIALS

(71) Applicant: SIKA TECHNOLOGY AG, Baar (CH)

(72) Inventors: Nayibe Guerrero, Querétaro (MX); Kimberly Gonzàlez, Querétaro (MX)

(73) Assignee: SIKA TECHNOLOGY AG, Baar (CH)

( * ) Notice: Subject to any disclaimer, the term of this patent is extended or adjusted under 35 U.S.C. 154(b) by 90 days.

(21) Appl. No.: 17/607,571

(22) PCT Filed: May 28, 2020

(86) PCT No.: PCT/EP2020/064861
§ 371 (c)(1),
(2) Date: Oct. 29, 2021

(87) PCT Pub. No.: WO2020/239919
PCT Pub. Date: Mar. 12, 2020

(65) Prior Publication Data
US 2022/0220040 A1    Jul. 14, 2022

(30) Foreign Application Priority Data

May 28, 2019    (EP) ..................................... 19177021

(51) Int. Cl.
*C04B 40/00* (2006.01)
*C04B 14/02* (2006.01)
(Continued)

(52) U.S. Cl.
CPC ........ *C04B 40/0039* (2013.01); *C04B 14/026* (2013.01); *C04B 14/386* (2013.01);
(Continued)

(58) Field of Classification Search
CPC . C04B 40/0039; C04B 14/026; C04B 14/386; C04B 24/2641; C04B 28/02
See application file for complete search history.

(56) References Cited

U.S. PATENT DOCUMENTS

| 6,034,208 A | * | 3/2000 | McDaniel | ................. C08F 2/40 |
| | | | | 528/421 |
| 8,951,343 B2 | | 2/2015 | Sadiq et al. | |
| | | | (Continued) | |

FOREIGN PATENT DOCUMENTS

| CN | 107352913 A | 11/2017 |
| EP | 1 061 089 A1 | 12/2000 |
| | (Continued) | |

OTHER PUBLICATIONS

Atieh et al. Effect of Carboxylic Functional Group Functionlization on Carbon Nanotubes Surface on the Removal of Lead from Water. Hindawi Publishing Corporation Bioinorganic Chemistry and Applications, vol. 2010, 9 pages. (Year: 2010).*
(Continued)

*Primary Examiner* — John E Uselding
(74) *Attorney, Agent, or Firm* — Oliff PLC

(57) ABSTRACT

An admixture for cement based compositions, the admixture including a) an aqueous solution of polycarboxylate ether and b) at least one functionalized nanomaterial selected from carbon nanotubes functionalized by carboxyl groups and carbon nanofibers functionalized by carboxyl groups, wherein the at least one functionalized nanomaterial is dispersed in the aqueous solution. Low dosages of the admixture in cement based compositions result in significant enhancement of compressive strength.

14 Claims, 6 Drawing Sheets

(51) Int. Cl.
 *C04B 14/38* (2006.01)
 *C04B 24/26* (2006.01)
 *C04B 28/02* (2006.01)
 *B82Y 30/00* (2011.01)
 *C04B 111/70* (2006.01)

(52) U.S. Cl.
 CPC .......... *C04B 24/2641* (2013.01); *C04B 28/02* (2013.01); *B82Y 30/00* (2013.01); *C04B 2111/70* (2013.01)

(56) References Cited

U.S. PATENT DOCUMENTS

| | | |
|---|---|---|
| 9,365,456 B2 | 6/2016 | Shah et al. |
| 2008/0134942 A1 | 6/2008 | Brenner et al. |
| 2009/0229494 A1 | 9/2009 | Shah et al. |
| 2013/0276674 A1 | 10/2013 | Korzhenko et al. |
| 2014/0060388 A1 | 3/2014 | Sadiq et al. |
| 2018/0053939 A1 | 2/2018 | Korzhenko et al. |

FOREIGN PATENT DOCUMENTS

| | | |
|---|---|---|
| EP | 1 138 697 A1 | 10/2001 |
| EP | 1 348 729 A1 | 10/2003 |
| EP | 2 514 728 A1 | 10/2012 |
| WO | 2009/099640 A1 | 8/2009 |

OTHER PUBLICATIONS

Yu et al. Effects of Carbon Nanofibers and Carboxyl Functionalized Multi-Walled Carbon Nanotubes on Mechanical Damping Behavior of Cement Paste. Journal of Nanoscience and Nanotechnology, vol. 19, 163-169, Jan. 1, 2019. (Year: 2019).*
Konsta-Gdoutos et al. Fresh and mechanical properties, and strain sensing of nanomodified cement mortars: The effects of MWCNT aspect ratio, density and functionalization. Cement and Concrete Composites 82 (2017) 137-151. (Year: 2017).*
Aug. 21, 2020 International Search Report issued in International Patent Application No. PCT/EP2020/064861.
Aug. 21, 2020 Written Opinion issued in International Patent Application No. PCT/EP2020/064861.
Geng Ying Li et al. "Mechanical Behavior and Microstructure of Cement Composites Incorporation Surface-Treated Multi-Walled Carbon Nanotubes". Carbon, vol. 43, No. 6, 2005, pp. 1239-1245.

\* cited by examiner

STRENGTH ENHANCER FOR CONCRETES BASED ON FUNCTIONALIZED NANOMATERIALS

TECHNICAL FIELD

The invention relates to an admixture for cement based compositions.

BACKGROUND OF THE INVENTION

Cement materials are widely used in construction applications. They are usually used for concretes or mortars typically also including aggregates and additives. For use, the cement based composition is mixed with water so that a reaction of the cement and water takes place, generally called hydration. Upon hydration the cement is hardened to form a solid building material.

An important property of such systems is compressive strength. So-called compressive strength enhancers which are added to cement based composition for enhancing the compressive strength of cement based composition are known. A recent development is the use of nanomaterials such as carbon nanotubes as compressive strength enhancer.

US 2008/0134942 A1 describes addition of carbon nanotubes to cement, aggregates, and plasticizers to form composites with increased strength. The mixture is prepared by adding carbon nanotubes to water, then adding cement and sand and finally adding superplasticizer and other material to the mixture.

U.S. Pat. No. 9,365,456 B2 describes sonification of an aqueous solution containing surfactant and carbon nanotubes to form a dispersion, which is mixed in cement. The surfactant may comprise a polycarboxylate based superplasticizer.

US 2013/0276674 A1 relates to a process comprising the preparation of an aqueous dispersion of carbon based nanofillers such as carbon nanotubes or carbon nanofibers in the presence of a superplasticizer by high speed mixing and the addition of the dispersion obtained into a curable inorganic system such as a cement base. High speed mixing can be performed by sonification, cavitation, high shear mixing or using a bead mill. The carbon nanotubes may be oxidized.

U.S. Pat. No. 8,951,343 B2 relates to ultra-high performance cement-based nanocomposites and a method for preparing them comprising preparation of a water-based mixture by addition of carbon nanofibers or graphite nanoplatelets, and dispersants comprising at least one of polyelectrolytes and surfactants to the mixing water of the cement-based nanocomposite, ultrasonication of the water-based mixture; and addition of the water-based mixture to a cementitious material. The carbon nanofibers or graphite nanoplatelets may be oxidized. As an example for the surfactant, water-reducers based on polycarboxylate are mentioned.

Disadvantages of the prior art systems are the need of complex dispersion devices and methods such as sonification in order to obtain suitable dispersions of the nanomaterial and/or only moderate compressive strength enhancement in relationship to the dosage of nanomaterials used. Since the costs for nanomaterial are significant, an improvement is desired from an economic point of view.

SUMMARY OF THE INVENTION

The object of the present invention is to provide an admixture containing nanomaterials for cement based compositions in order to achieve enhanced compressive strength of the cementitious materials wherein the nanomaterials can be properly dispersed in the admixture without complex dispersion means being required. In addition, the admixture shall allow a considerably lower dosage of the nanomaterials or admixture, respectively, to be added in the cement based compositions for the compressive strength enhancement desired.

Surprisingly, this object could be achieved by an admixture as defined in claim 1.

Accordingly, the present invention relates to an admixture for cement based compositions, wherein the admixture comprises
  a) an aqueous solution of polycarboxylate ether and
  b) at least one functionalized nanomaterial selected from carbon nanotubes functionalized by carboxyl groups and/or carbon nanofibers functionalized by carboxyl groups, wherein the at least one functionalized nanomaterial is dispersed in the aqueous solution.

By using low dosages of the admixture of the invention in cement based compositions, a strong enhancement of compressive strength for both early strength and final strength can be obtained. Surprisingly, an appropriate dispersion of the functionalized nanomaterial in the aqueous polycarboxylate ether for preparing the admixture can be achieved by simple mixing means such as stirring rods or magnetic stirring.

Carbon nanotubes as well as carbon nanofibers which have been functionalized with carboxyl groups, e.g. by chemically functionalizing them using a variation of the so-called Hummers' method, show improved dispersion into the polycarboxylate ether. Such functionalized carbon nanotubes and carbon nanofibers dispersed into the polycarboxylate ether matrix and added to a cement based composition, enhance the early and final compressive strength of concrete with a low dosage of the admixture by weight of cement.

The invention is also related to a cement based composition, comprising the admixture according to the invention, and the use of the admixture as a compressive strength enhancer for cement based materials. Preferred embodiments of the invention are recited in the dependent claims.

DETAILED DESCRIPTION OF THE INVENTION

Figure 1:
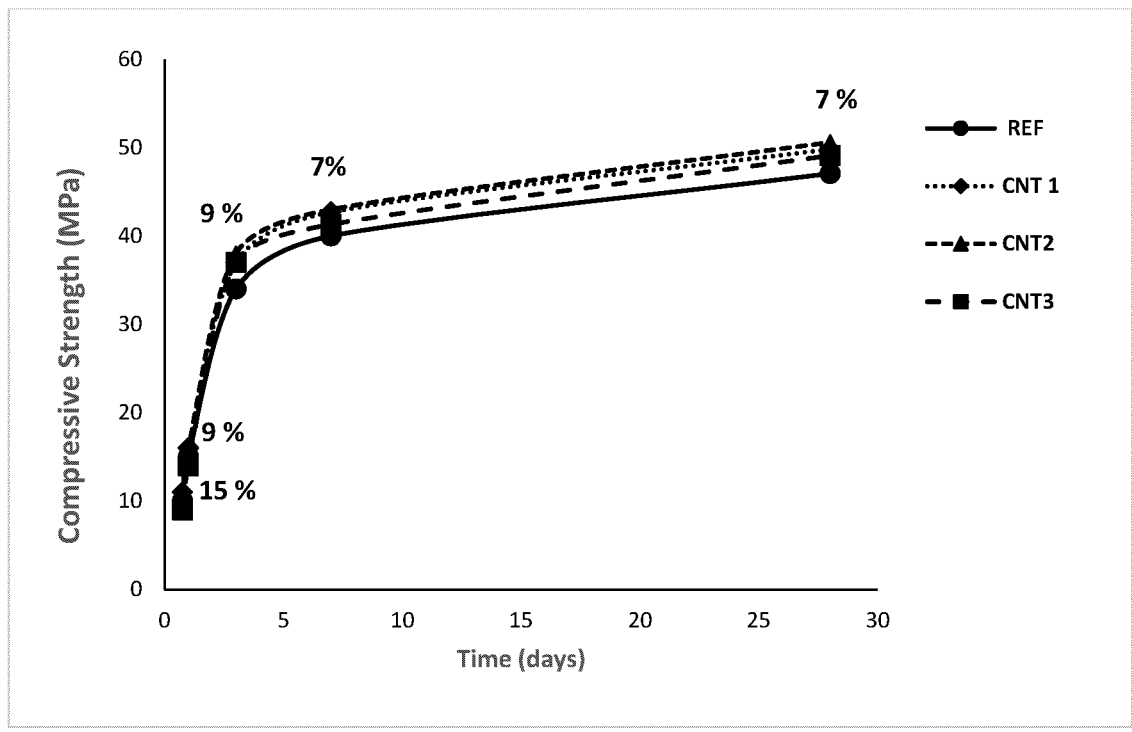
FIG. 1 is a graph showing the compressive strength development determined in Example 2.

The admixture for cement based compositions according to the invention comprises a) an aqueous solution of polycarboxylate ether and b) at least one functionalized nanomaterial, wherein the at least one functionalized nanomaterial is dispersed in the aqueous solution.

The functionalized nanomaterial is selected from carbon nanotubes functionalized by carboxyl groups and/or carbon nanofibers functionalized by carboxyl groups.

The use of carbon nanotubes functionalized with carboxyl groups can deliver better early strength of the cementitious material, while with the carbon nanofibers functionalized with carboxyl groups a better final strength is possible. Therefore carbon nanotubes functionalized with carboxyl groups are particular suitable e.g. for precast applications.

Carbon nanotubes (CNTs) are generally cylinder-shaped macromolecules which may have a radius as small as a few nanometres and can be grown up to 20 cm in length. The walls of these nanotubes are made up of a hexagonal lattice of carbon atoms analogous to the atomic planes of graphite.

A CNT is often composed of a concentric arrangement of two or more cylinders, usually many cylinders, which can reach diameters of up to 100 nm. Multiple layers of graphite superimposed and rolled in on themselves form the tubular shape. Such CNT are called multi-walled carbon nanotubes (MWCNTs). There exists also CNT composed of one cylinder called single-walled nanotubes (SWCNTs). It can be considered as a honeycomb lattice of carbon atoms rolled into a hollow cylinder. SWCTNs usually have diameters ranging from 0.4 to 3 nm.

CNT such as multi-walled carbon nanotubes or single-walled nanotubes are known and commercially available. Established methods for the production thereof are e.g. catalytic decomposition of a gaseous carbon feedstock such as alkanes or CO, laser ablation based on laser irradiation of graphite containing appropriate catalyst particles, arc discharge between two graphite rods in the presence of suitable catalyst particles, and chemical vapour deposition (CVD) methods.

Carbon nanofibers (CNFs) are cylindrical nanostructures with graphene layers arranged as stacked cones, cups or plates. Carbon nanofibers are generally vapour-grown, e.g. by chemical vapour deposition (CVD) methods such as catalytical CVD. Carbon nanofibers can now be produced at relatively large quantities, and are commercially available. Their current cost is much lower than that of carbon nanotubes.

According to the present invention, the carbon nanotubes and/or carbon nanofibers used are functionalized by carboxyl groups. This means that carboxyl groups are covalently attached to the carbon nanotubes and/or carbon nanofibers. The carboxylic groups present on the carbon nanotubes and/or carbon nanofibers can be in the protonated form (—COOH) or in the ionic form (—COO$^-$). In case of the ionic form, of course, a counter ion is present to form a solid salt or a dissolved salt, e.g. in the aqueous solution. Examples for appropriate counter ions are an alkali metal ion, alkaline earth metal ion, a di- or trivalent metal ion, an ammonium ion or an organic ammonium group.

In a preferred embodiment the functionalized nanomaterial is selected from single-walled functionalized by carboxyl groups or multi-walled carbon nanotubes functionalized by carboxyl groups, wherein multi-walled carbon nanotubes functionalized by carboxyl groups are preferred. In a preferred embodiment, the functionalized nanomaterial is selected from carbon nanofibers functionalized by carboxyl groups.

The carbon nanotubes functionalized by carboxyl groups preferably have a diameter in the range of 10 to 90 nm, more preferably 30 to 70 nm. The carbon nanofibers functionalized by carboxyl groups have a diameter in the range of e.g. 50 to 500 nm or 50 to 200 nm, preferably 120 to 190 nm, more preferably 140 to 170 nm. The diameter indicated refers to the inner diameter.

The length of the functionalized nanomaterial may vary. For instance, the carbon nanotubes functionalized by carboxyl groups and the carbon nanofibers functionalized by carboxyl groups may have a length in the range of from 1 to 100 micrometre, preferably 2 to 50 micrometre, and more preferably 2 to 25 micrometre.

The aspect ratio is defined as the ratio of the length to the diameter of the functionalized nanomaterial. For instance, the carbon nanotubes functionalized by carboxyl groups and the carbon nanofibers functionalized by carboxyl groups may have an aspect ratio in the range of from 5 to 750, preferably 10 to 350, more preferably 40-250, especially 60-170.

The functionalization of the carbon nanotubes or carbon nanofibers by carboxyl groups can be effected by any method known in the prior art, wherein the carbon nanotubes or the carbon nanofibers are preferably functionalized by an oxidative treatment, e.g. by chemical or electrochemical oxidative treatment.

The oxidative treatment preferably comprises treatment of the carbon nanotubes or carbon nanofibers with a composition containing or consisting of one or more appropriate oxidizing agent. Suitable oxidizing agent are e.g., concentrated sulfuric acid, potassium permanganate, nitric acid or combinations thereof.

In a preferred embodiment, the carbon nanotubes or carbon nanofibers are treated with an acidic oxidative liquid to functionalize the carbon nanotubes or carbon nanofibers with carboxylic groups. The acidic oxidative liquid contains one or more appropriate oxidizing agent. The acidic oxidative liquid may contain e.g. concentrated sulfuric acid with potassium permanganate, and sodium nitrate acting as catalysts, as is used in the so-called Hummers' method and modified versions thereof, suitable for functionalization of carbon nanotubes or carbon nanofibers with carboxylic groups.

In a preferred embodiment, the proportion of functionalized nanomaterial in the admixture is in the range of 0.04 to 0.4% by weight, preferably 0.08 to 0.2% by weight, based on the total weight of the admixture.

The admixture according to the invention further comprises polycarboxylate ether in form of an aqueous solution. In a preferred embodiment, the proportion of polycarboxylate ether in the admixture is in the range of 10 to 70% by weight, preferably 20 to 65% by weight, more preferably 40 to 60% by weight, based on the total weight of the admixture.

The polycarboxylate ether is in particular a comb polymer having a polycarboxylate backbone and polyether side chains, wherein the polyether side chains are preferably linked to the polycarboxylate backbone via ester, ether and/or amide groups. Polycarboxylate ethers are commercially available.

The polycarboxylate ether may comprise the following partial structural units or consists thereof:

a) a partial structural unit S1 of formula (I) in a mole fraction of a

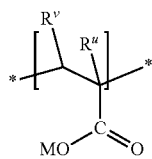

(I)

b) a partial structural unit S2 of formula (II) in a mole fraction of b

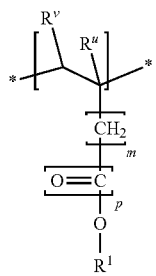

(II)

c) a partial structural unit S3 of formula (III) in a mole fraction of c

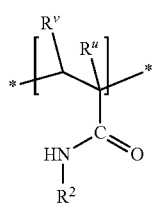

(III)

d) a partial structural unit S4 of formula (IV) in a mole fraction of d

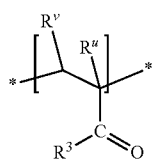

(IV)

wherein

M independent from each other is $H^+$, an alkali metal ion, alkaline earth metal ion, a di- or trivalent metal ion, an ammonium ion or an organic ammonium group, each $R^u$ independent from the others is hydrogen or a methyl group, each $R^v$ independent from the others is hydrogen or COOM, m=0, 1 or 2, p=0 or 1, $R^1$ and $R^2$ independent from each other are a $C_1$ to $C_{20}$-alkyl group, -cycloalkyl group, -alkylaryl group or -[AO]$_n$—$R^4$, wherein A=$C_2$ to $C_4$-alkylene, $R^4$ is H, a $C_1$ to $C_{20}$-alkyl group, -cyclohexyl group or -alkylaryl group, and n=2-250, wherein $R^1$ and/or $R^2$ or at least a part of $R^1$ and/or $R^2$ is preferably -[AO]$_n$—$R^4$, $R^3$ independent from each other is $NH_2$, —$NR^5R^6$, —$OR^7NR^8R^9$, wherein $R^5$ and $R^6$ independent from each other are a $C_1$ to $C_{20}$-alkyl group, -cycloalkyl group, -alkylaryl group or -aryl group; or a hydroxyalkyl group or a acetoxyethyl group ($CH_3$—CO—O—$CH_2$—$CH_2$—) or a hydroxyisopropyl group (HO—CH($CH_3$)—$CH_2$—) or an acetoxyisopropyl group ($CH_3$—CO—O—CH($CH_3$)—$CH_2$—); or $R^5$ and $R^6$ together form a ring, the nitrogen being a part thereof, to form a morpholine or imidazoline ring;

$R^7$ is a $C_2$-$C_4$-alkylene group, $R^8$ and $R^9$ each are independent from each other a $C_1$ to $C_{20}$-alkyl group, -cycloalkyl group, -alkylaryl group, -aryl group or a hydroxyalkyl group, and wherein a, b, c and d represent mole fractions of the respective partial structural units S1, S2, S3 and S4, wherein a/b/c/d=(0.1-0.9)/(0.1-0.9)/(0-0.8)/(0-0.8), preferably a/b/c/d=(0.3-0.9)/(0.1-0.7)/(0-0.6)/(0-0.4), provided that a+b+c+d=1.

The inventors surprisingly found that a particular class of polycarboxylate ethers as defined below is particularly well suited as dispersant. Dispersing of the functional nanomaterial into the aqueous solution is significantly easier when an aqueous solution of such particular class of polycarboxylate ethers is used and more stable dispersions are obtained. The addition of the resulting admixtures into cement based composition results in a further improved compressive strength enhancement. A significant lower dosage of the admixture is required for achieving the desired compressive strength enhancement.

Accordingly, in a particular preferred embodiment a particular class of polycarboxylate ethers is used, wherein the polycarboxylate ether comprises or consists of a) a partial structural unit S1 of formula (I) in a mole fraction of a

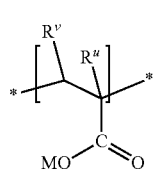

(I)

b) a partial structural unit S2 of formula (II) in a mole fraction of b

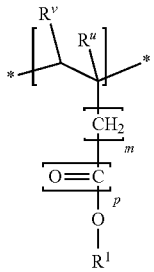
(II)

wherein

M independent from each other is $H^+$, an alkali metal ion, alkaline earth metal ion, a di- or trivalent metal ion, an ammonium ion or an organic ammonium group, wherein M is preferably $H^+$ or $Na^+$;

each $R^u$ independent from the others is hydrogen or a methyl group, each $R^v$ is hydrogen;

m=1 or 2, preferably 1;

p=0;

$R^1$ is $-[AO]_n-H$, wherein $A=C_2$ to $C_4$-alkylene, preferably $C_2H_4$, and n is from 20 to 150, more preferably from 40 to 90; and the molar ratio a/b of the mole fraction a of the partial structural unit S1 to the mole fraction b of the partial structural unit S2 is in the range from 6/1 to 2.5/1, preferably from 5/1 to 3/1, provided that a+b=1.

In a particular preferred embodiment, A is $C_2H_4$, and n is 50 to 60, e.g. approximately 54, with a molar ratio a/b of about 1:0.28, e.g. 1:0.25 to 1:0.30.

The following preferred embodiments applies to both the general definition of the polycarboxylate ether and the particular class of polycarboxylate ether as defined above, unless otherwise stated.

The sequence of the partial structural units S1, S2, S3 and S4 for the general definition or of the partial structural units S1 and S2 for the particular class may be alternating, blockwise or random. In principle, it is also possible that in addition to the partial structural units S1, S2, S3 and S4 for the general definition or to the partial structural units S1 and S2 for the particular class further structural units are present.

The weight proportion of the partial structural units S1, S2, S3, and S4 together for the general definition or of the partial structural units S1 and S2 together for the particular class is preferably 50 to 100% by weight, more preferably 90 to 100% by weight and still more preferably 95 to 100% by weight with respect to the total weight of the polycarboxylate ether.

According to a further preferred embodiment, the polycarboxylate ether is free of aromatic compounds and/or aromatic structural units.

The weight average molecular weight (Mw) of the polycarboxylate ether is preferably 5,000-150,000 g/mol, more preferably 10,000-100,000 g/mol. The weight average molecular weight can be determined by gel permeation chromatography (GPC).

Methods for preparing the polycarboxylate ether are known to the skilled person. The preparation may be e.g. carried out by radical polymerization of the corresponding monomers of formula $(I_m)$, $(II_m)$, $(III_m)$ and/or $(IV_m)$ or of formula $(I_m)$ and $(II_m)$, respectively, resulting in a polycarboxylate ether having the partial structural units S1, S2, S3 and S4, or the partial structural units S1 and S2, respectively, preferably in the mole fractions indicated above. The residues $R^u$, $R^v$, $R^1$, $R^2$, $R^3$, M, m and p are defined as described above.

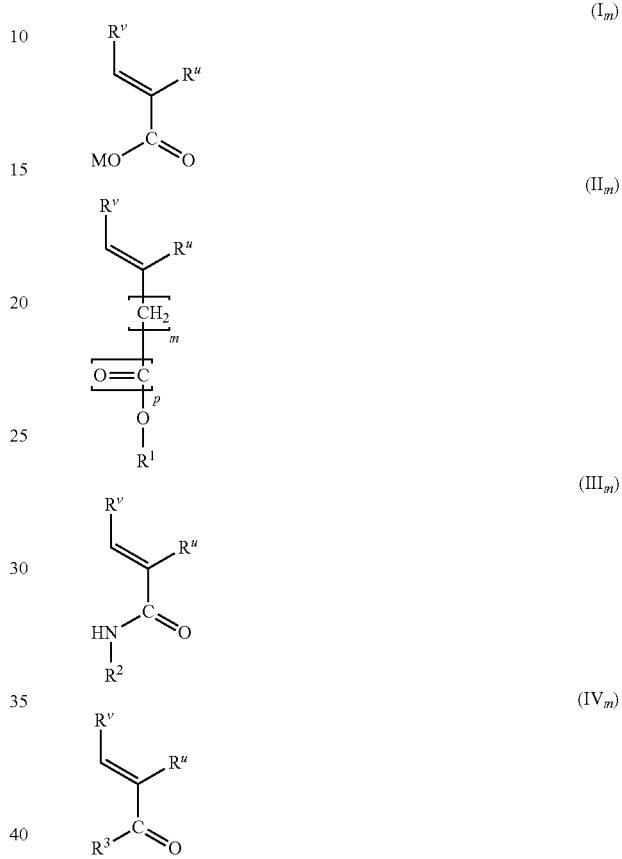

It is also possible to prepare the polycarboxylate ether by polymer-analogous reaction of a polycarboxylic acid or salt of formula (V), wherein $R^v$, $R^u$ and M are defined as described above and n represents the polymerization degree of the polymer.

(V)

In the polymer-analogous reaction a polycarboxylic acid or salt of formula (V) is esterified and/or amidated with the corresponding alcohols or amines (e.g. $HO-R^1$, $H_2N-R^2$, $H-R^3$) and then optionally neutralized or partially neutralized (depending on the type of residue M e.g. with metal hydroxides or ammonia).

Details on the polymer-analogous reaction are disclosed e.g. in EP 1138697 B1 on page 7, line 20, to page 8, line 50, and in the examples thereof, or in EP 1061089 B1 on page 4, line 54, to page 5, line 38, and in the examples thereof. In a variant thereof, as described in EP 1348729 A1 on page 3 to page 5 and in the examples thereof, the polycarboxylate ether can be prepared in the solid state of matter. The disclosures of the patent publications mentioned are herewith enclosed by reference. The preparation by polymer-analogous reaction is preferred.

Such polycarboxylate ether comb polymers are also distributed commercially by Sika Schweiz AG under the trade name series ViscoCrete®.

A good dispersion of the functionalized nanomaterial in the aqueous polycarboxylate ether can be achieved by simple means, e.g. by mechanical stirring, e.g. with a stirring rod, or by magnetic stirring. A proper dispersion of nanomaterial is important because it makes sure that the enhancement of mechanical properties of cement based compositions such as concrete is equally distributed along the whole cement based composition.

The weight of water, polycarboxylate ether and functionalized nanomaterial together in the admixture of the invention may be e.g., at least 50% by weight, preferably at least 75% by weight, based on the total weight of the admixture.

In a specific embodiment, the inventive admixture essentially consists of the aqueous solution of polycarboxylate ether and the functionalized nanomaterial, meaning that the weight of water, polycarboxylate ether and functionalized nanomaterial together in the admixture is in the range of about 98 to 100% by weight based on the total weight of the admixture.

In an alternative embodiment, the inventive admixture further comprises one or more additives, which are common in this technical field. The additive is for instance at least one selected from plasticizers or superplasticizers other than polycarboxylate ethers, strength enhancers such as triethanolamine (TEA), retarders such as gluconate, and vinasse, accelerators, air entrainers, defoamers, corrosion inhibitors, expansion producing agents, pigments, fibres, waterproofing additives, biocides, thickeners and alkali-aggregate reaction inhibitors.

In general, the admixture is free of hydraulic binders, in particular the admixture is free of cement.

The present invention also relates to a cement based composition, comprising cement and the admixture according to the invention.

The cement based composition according to the invention can be obtained by adding the admixture according to the invention to a composition comprising cement.

The cement may comprise Portland cement, calcium aluminate cement (CAC) and/or other hydraulic binders such as fly ash, granulated blast furnace slag, lime, such as limestone and quicklime, fumed silica and pozzolana or a mixture thereof. The cement is for instance a Portland cement or calcium aluminate cement. The cement preferably comprises a Portland cement or a mixture of Portland cement with at least one of fly ash, granulated blast furnace slag, lime, such as limestone and quicklime, fumed silica and pozzolana. A cement usually comprise in addition calcium sulfate, such as gypsum, anhydrite and hemihydrate.

Cements can be classified based on the composition according to standards such as the European cement standard EN 197-1 or corresponding other national standards. Common cements are Portland cements, Portland-composite cements, blast furnace cements, puzzolanic cements and composite cements.

The cement based composition according to the invention may be a composition consisting of the cement and the admixture. Usually, the cement based composition according to the invention may comprise in addition water, one or more additives and/or aggregates.

Typical examples of common additives or cement additives, respectively, are grinding aids, plasticizers, accelerators, corrosion inhibitors, retardants and shrinkage reducing agents. These additives are common and well known in the field of cement industry. Typical examples of aggregates are sand, gravel, crushed stone, quartz powder. As indicated above, the admixture may contain one or more additives, but, of course, one or more additives may be added separately to the cement based composition.

When water is added to the cement based composition, the cement based composition forms a cement paste which finally results in the hardened cement based composition by the process of hydration. The water/cement ratio (w/c ratio) used may range e.g. from 0.25 to 0.6, preferably 0.35 to 0.5.

In a preferred embodiment, the proportion of the admixture in the cement based composition is in the range of 0.01 to 1.5% by weight, preferably 0.02 to 1.0% by weight, more preferably 0.04 to 0.5% by weight, based on the weight of the cement.

In a further preferred embodiment, the proportion of the functionalized nanomaterial in the cement based composition is in the range of 0.00001 to 0.2% by weight, preferably 0.00005 to 0.1% by weight, more preferably 0.0001 to 0.05% by weight, especially 0.001 to 0.05% by weight, each based on the weight of the cement.

Interestingly, higher quantities of functionalized nanomaterial do usually not additionally improve performance. Without wishing to be bound to any theory, it is assumed that the reason may be a weaker dispersion in the admixture at higher quantities.

It is preferred that the cement based composition is a concrete, a mortar or a grouting material.

The present invention also relates to the use of an admixture according to the invention as a compressive strength enhancer in a cement based composition.

The admixture can be added to a dry composition comprising the cement or the admixture can be added during or after addition of water to the cement based composition.

The present invention also relates to a shaped body which is obtainable by curing a cement based composition as defined above. In order to obtain the shaped body, the process comprises adding water to the cement based composition, moulding the cement paste obtained into the desired shape, and curing, resulting in the hardened cement based composition. As discussed, curing is effected by hydration.

Next, the invention is further explained by examples. However, the examples are for illustration only, and shall not be considered as limiting the scope of the invention.

EXAMPLES

In the following, amounts and percentages are based on weight unless otherwise indicated. The following compounds were used in the examples.

| | |
|---|---|
| PCE 1 | aqueous polycarboxylate ether solution (55% solids) of copolymer of 3.6 molar parts acrylic acid and 1 molar part ethoxylated methallylalcohol (Mw = 2400 g/mol) |
| PCE 2 | aqueous polycarboxylate ether solution (50% solids) of copolymer of 2.9 molar parts acrylic acid, 1 molar part ethoxylated |

| | |
|---|---|
| PCE 3 | methallylacohol (Mw = 2400 g/mol), and 2.6 molar parts 2-hydroxyethylacrylate aqueous polycarboxylate ether solution (50% solids) of copolymer of 2.2 molar parts acrylic acid and 1 molar part ethoxylated methallylacohol (Mw = 2400 g/mol) |
| Cement CPC 40 RS Cruz Azul | Blended Portland Cement from Cruz Azul. Resistance class 40, sulphate resistant. Meets Mexican standard NMX-C-414-ONNCCE. |
| Cement CPC 40 RS Cemex | Blended Portland Cement from Cemex. Resistance class 40, sulphate resistant. Meets Mexican standard NMX-C-414-ONNCCE. |
| Cement CPC 40 Holcim | Blended Portland Cement from Holcim. Resistance class 40, sulphate resistant. Meets Mexican standard NMX-C-414-ONNCCE. |
| Cement CPC 40 RS Moctezuma | Blended Portland Cement from Moctezuma. Resistance class 40, sulphate resistant. Meets Mexican standard NMX-C-414-ONNCCE. |

Compressive strength of specimens was measured according to ASTM C 39/C39 M.

Synthesis Example

Functionalization Process for Carbon Nanotubes and Carbon Nanofibers

A modified Hummer's method (oxidative treatment) was used to functionalize the carbon nanotubes and/or nanofibers.

Materials

Carbon nanotubes (50-70 nm diameter, 5 microns length) and carbon nanofibers (100-160 nm diameter and 6-8 microns length), sodium nitrate, sulfuric acid (98%), potassium permanganate, distillated water, hydrochloric acid (10%), hydrogen peroxide (30%)

Equipment

Cooling bath, magnetic stirring, centrifuge, furnace, ultrasonic bath

Experimental Procedure:

In a round bottom flask, add 2 g of carbon nanotubes and 1 g of sodium nitrate, mix this with 46 ml of concentrated sulfuric acid. The reaction solution needs to be constantly stirred and placed in a cooling bath during 15 minutes. Subsequently, slowly add potassium permanganate (6 g) while constantly stirring and keeping the temperature controlled below 20° C. during the addition. Subsequently, add carefully, drop by drop a total of 92 ml of distilled water, the temperature of the mixture quickly increases and there is some vapor release. After this, the mixture should be stirred during 1 hour at room temperature in an ultrasonic bath.

Dilute the mixture with 280 ml of distilled water and neutralize the remaining magnesium permanganate with drops of hydrogen peroxide until bubble release of the admixture stops.

Wash the deposit with distilled water and hydrochloric acid. Excess of acid is removed through centrifugation at 4000 rpm during 7 min. The obtained product is collected and dried in a furnace at 70° C. during 24 hours.

The procedure yields carbon nanotubes which are functionalized with carboxyl groups. The same procedure using the carbon nanofibers instead of the carbon nanotubes yields carbon nanofibers which are functionalized with carboxyl groups.

Example 1

Carbon Nanotubes/Nanofibers Dispersion into PCE

The functionalized carbon nanotubes and functionalized carbon nanofibers obtained in above Synthesis Example were tested for dispersibility in various PCE solutions (PCE 1, PCE 2, and PCE 3). As a reference, the non-functionalized carbon nanotubes and carbon nanofibers were tested in the same way.

General Procedure

Heat the PCE solution up to 40° C. maximum, after that, add the carbon nanotubes or carbon nanofibers and stir during 30 min with magnetic stirring. If there are still particles without mixing, use ultrasonic waves for 20 min or until fully dispersed.

Assessment of Dispersibility

The quality of the dispersions obtained were assessed by pouring approximately 15 ml of the admixture on a glass and homogeneity of the admixture was visually assessed immediately. The degree of homogeneity is a measure of the quality of the dispersion.

Results of Dispersion

Functionalized carbon nanotubes and functionalized carbon nanofibers were each dispersed into the PCE 1, PCE 2, and PCE 3. For both the functionalized carbon nanotubes and the functionalized carbon nanofibers, the best results were seen with PCE 1 (best homogeneity of dispersion). The reference tests using corresponding non-functionalized carbon nanotubes show a significant lower homogeneity compared to the functionalized carbon nanotubes in the same PCE solution.

Example 2

Admixtures 0.1% (w/w) of 3 kind of multi-walled carbon nanotubes (MWCNT) were mixed separately with PCE 1. Carbon nanotubes (CNT1) with diameter of 30-70 nm and 5 microns length, and carbon nanofibers (CNT2 and CNT3) with diameters of 140-160 nm and 7-8 microns length were used. CNT1 and CNT2 were functionalized using the modified Hummers' method as described in the above Synthesis Example. CNT3 was used as it comes from supplier without functionalization. Physico-chemical properties of the PCE 1/CNTs samples were not significant different from PCE 1.

In the following, the expression f'c is the compressive strength at 28 days by design. That means the minimum value of compressive strength that should be achieved by estimation. By definition f'c is the specified compressive strength of concrete using standard cylinders of six inches diameter and twelve inches height. Usually this is prescribed at the age of 28 days.

Concrete Testing

Cement CPC 40 RS Cruz Azul

Andesita Sand

Basalt gravel 20 mm f'c=34.3 MPa ratio w/c=0.5

Cement in the mix=10 kg

Dosage of admixture added=0.09% by weight of cement

Specimens obtained by addition of the above admixtures to the cement were tested. As a reference (REF), PCE 1 without incorporation of carbon nanotubes or nanofibers is used as admixture and the resulting cement was tested in the same way. The compressive strength was determined at various times. The results are given in FIG. 1. As can be seen from FIG. 1, at early age (18 hrs) the sample with carbon nanotubes CNT1 (PCE 1+CNT1) showed the higher increase of 15%, and at final age the sample with carbon nanofibers CNT 2 (PCE 1+CNT2) showed the higher increase of 7%.

In this example, nano-composite admixtures, based on PCE 1 and carbon nanofibers/carbon nanotubes were prepared and used to increase the compressive strength of concrete using Cruz Azul cement. Results shows enhancement in compressive strength, using a low dosage of the admixture (0.09% by weight of cement).

Example 3

Admixtures 0.4% (w/w) of 2 kind of multi-walled carbon nanotubes (MWCNT) were mixed separately with PCE 1. Carbon nanotubes (CNT1) with diameter of 30-70 nm and 5 microns length, and carbon nanofibers (CNT2) with diameters of 140-160 nm and 7-8 microns length are used. CNT1 and CNT2 were functionalized locally with carboxyl groups using the modified Hummers' method as described in the above Synthesis Example. Physico-chemical properties of the PCE 1/CNTs samples were not significant different from PCE 1.

Figure 2:
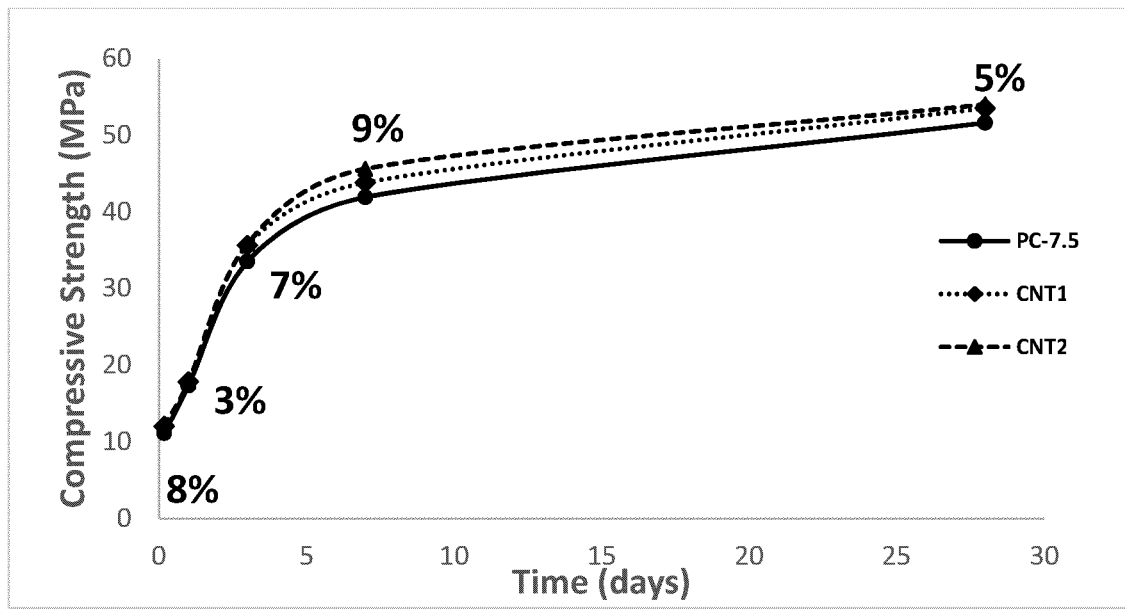
FIG. 2 is a graph showing the compressive strength development determined in Example 3.

Concrete testing
Cement CPC 40 RS Cruz Azul
Andesita Sand
Basalt gravel 20 mm
f'c=34.3 MPa
ratio w/c=0.5
Cement in the mix=10 kg
Dosage of admixture added=0.09% by weight of cement Specimens obtained by addition of the above admixtures to the cement were tested. As a reference, PCE 1 without incorporation of carbon nanotubes or nanofibers is used as admixture and the resulting cement was tested in the same way. The compressive strength was determined at various times. The results are given in FIG. 2. As can be seen from FIG. 2, at early age (18 hrs) the sample with carbon nanotubes CNT1 (PCE 1+CNT1) showed the higher increase of 8% at compressive strength, and at final age the sample with carbon nanofibers CNT 2 (PCE 1+CNT2) showed the higher increase of 5%.

In this example, nano-composite admixtures, based on PCE 1 and carbon nanofibers/carbon nanotubes were prepared and used to increase the compressive strength of concrete using Cruz Azul cement. The concentration of CNTs in the PCE was increased and very similar results were obtained to those found in the previous Example 2 at lower concentration. The used dosage of the admixture was the same one than in the previous test (0.09% by weight of cement).

Carbon nanotubes, as well as carbon nanofibers, showed an increase in compressive strength in concrete tests, indicating that the functionalization process was effective.

These samples have a higher concentration of carbon nanotubes (0.4%). Although they did not show the same percentage of increase in compressive strength with respect to the Example 2 results, the same trend is observed. A greater increase at early ages with the sample CNT1 and at higher increase at final age with the sample CNT2.

Therefore, there is no additional benefits on increasing the concentration of carbon nanotubes in the admixture. This make sense, since this type of multi-walled carbon nanotubes are most effective at lower concentrations, which make them more adequate for the intended purposes.

Example 4

In this example, a nano-composite admixture was prepared and used to enhance the properties of mortars and concretes using Cruz Azul cement. Results shows enhancement on compressive strength.

Admixtures 0.1% (w/w) of two kinds of carbon nanofibers and one kind of multiwall carbon nanotubes (MWCNT) were mixed separately with PCE 1.

CNTA: Carbon nanofibers with diameter of 160 nm and 8 micron length.

CNTB catalytic carbon nanofibers produced by chemical vapor deposition (CVD), with an average diameter of 140 nm and 7 micron length CNTF: CNTB carbon nanotubes functionalized locally with carboxyl groups, using an oxidative treatment (the modified Hummers' method as described in the above Synthesis Example).

3 kind of mixing methods were tested: mechanical stirring, vortex mixer and magnetic stirring. Mechanical stirring is preferred.

QC Properties of Admixtures Prepared

TABLE 0

Properties of PCE 1 and PCE 1 with Carbon Nanotubes

| Property | Specification | Reference (PCE 1) | PCE 1/ CNTA | PCE 1/ CNTB | PCE 1/ CNTF |
|---|---|---|---|---|---|
| Viscosity @ 23° C. sp. 2, 20 rpm; cP | 400-600 | 560 | 560 | 560 | 560 |
| Density @ 23° C.; g/mL | 1.10-1.12 | 1.111 | 1.117 | 1.117 | 1.113 |
| pH @ 23° C.; | 3-4 | 4 | 4 | 4 | 4 |
| Solid content (%) | 54.5-55-5 | 55 | 55.5 | 55.5 | 54.8 |
| Appearance | clear solution | clear solution | blackish | blackish | blackish |

Concrete Testing

Two mix designs were used in concrete testing, a high cement consumption f'c 44.1 MPa and a medium/low cement consumption f'c 34.3 MPa. Regarding compressive strength enhancement of 8% was observed at 28 days, for f'c 44.1 and 6% for f'c 34.3.

Figure 3:
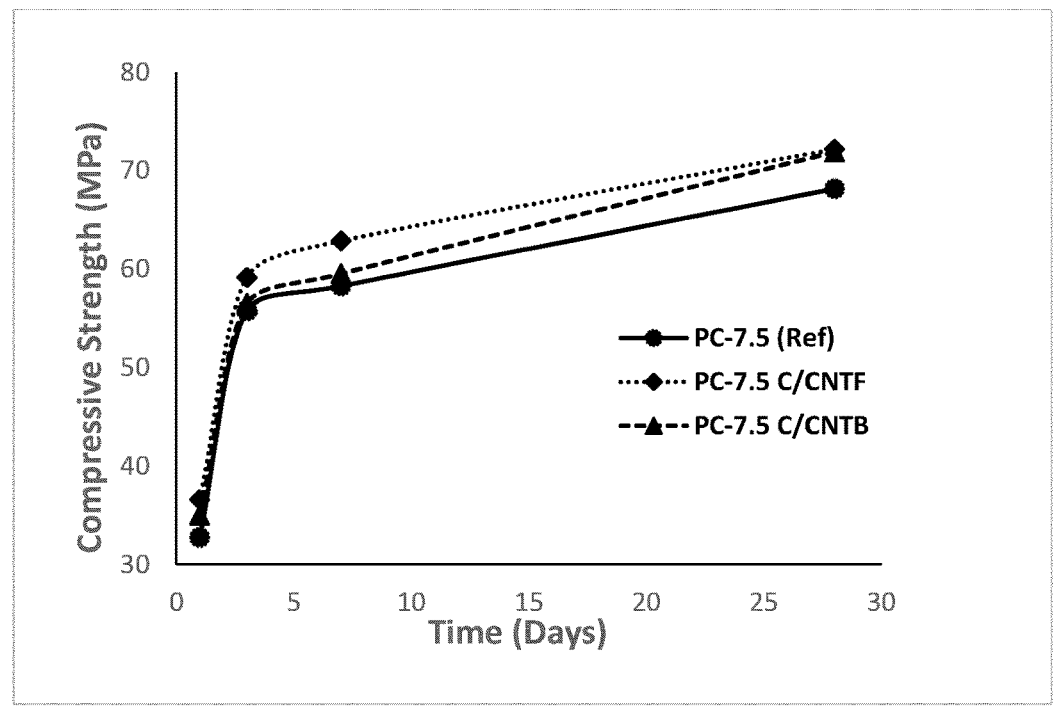
FIG. 3 is a graph showing the compressive strength development determined in Example 3 for f'c 44.1 MPa.

Cement CPC 40 Cruz Azul
f"c=44.1 MPa
ratio w/c=0.36
Cement in the mix=12 kg
Dosage of admixture=0.065% by weight of cement The specimen was tested with respect to compressive strength development. The obtained results are shown in FIG. 3.

Figure 4:
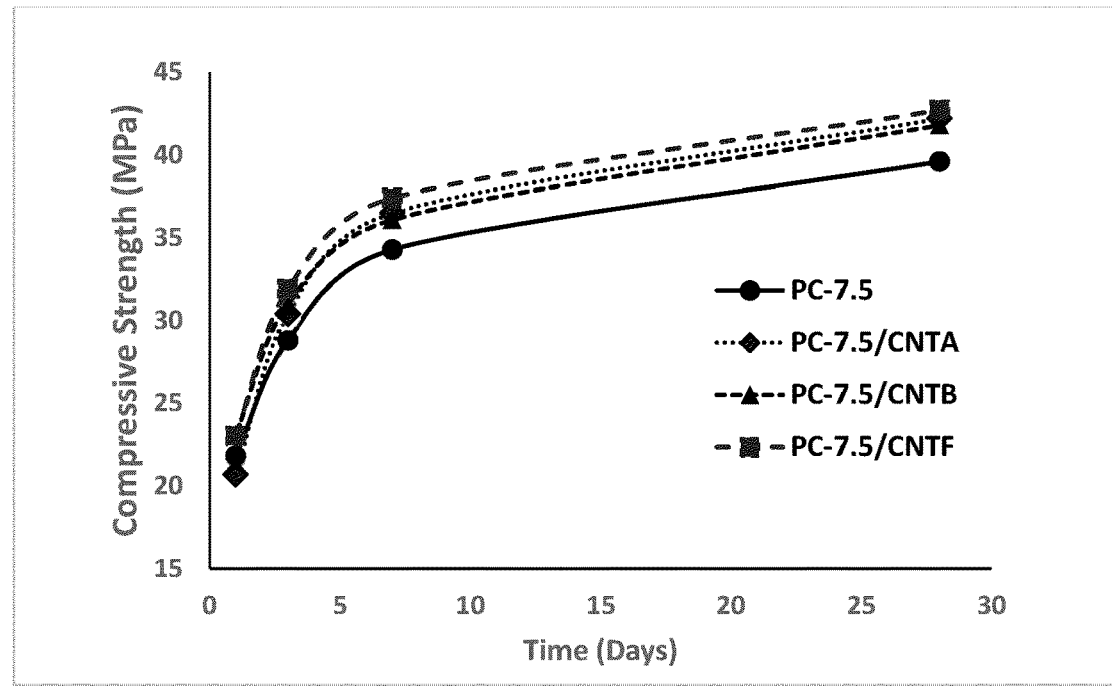
FIG. 4 is a graph showing the compressive strength development determined in Example 3 for f'c 34.3 MPa.

Cement CPC 40 Cruz Azul
f'c=34.3 MPa
ratio w/c=0.5
Cement in the mix=10 kg
Dosage=0.09% by weight of cement The specimen was tested with respect to compressive strength development. The obtained results are shown in FIG. 4.

Admixtures based on nanocomposites can be successfully used as compressive strength enhancer for mortars and concrete. Results on concrete showed that with very low dosages (0.065 and 0.09% by weight of cement) compressive strength can improved 6 and 8% at 28 days. In some cases at early ages compressive strength can be higher. The cement is not colored by the addition of the admixture.

Example 5

In this example, nano-composite admixtures based on PCE 1 and carbon nanotubes were prepared and used to increase the compressive strength of concrete using Cemex, Holcim and Moctezuma cement. The concentration of CNTs in the admixture were 0.05, 0.1, and 0.2%. Three w/c ratio were used, 0.35, 0.4 and 0.5. The compressive strength at 18 h, 24 h, 3 days and 7 days is presented. All samples were compared to PCE 1 (without addition of carbon nanotubes) as reference. Moctezuma cement showed higher increase on compressive strength with lower dosage of admixture (0.08%) and 0.2% of CNT in the nanocomposite admixture.

Admixtures 0.05, 0.1 and 0.2% (w/w) of multi-walled carbon nanotubes (MWCNT) were mixed separately with PCE 1. Carbon nanotubes (CNT1) with inner diameter of 30-70 nm and 5 microns length were used. CNT1 were functionalized locally with carboxyl groups using the modified Hummers method as described in the above Synthesis Example.

As in previous tests, physico-chemical properties of the PCE 1/CNTs samples were not significant different from PCE 1.

The results of the concrete testing are given in Tables 4, 5 and 6 below, in which the improvements in compressive strength increase compared to the reference (PCE 1 without carbon nanotubes) are summarized.

Concrete Testing

A) Cemex Cement
Cement CPC 40 RS Cemex
f'c=34.3 MPa
ratio w/c=0.35
Cement in the mix=9.5 kg
Dosage=0.4% by weight of cement Specimens obtained by addition of the admixtures to the cement were tested. The compressive strength was determined at various times. The results are given in Tables 4, 5 and 6 below. As can be seen from Tables 4, 5 and 6, for CNT1 (0.05%), the compressive strength increased between 3-5%, for CNT1 (0.1%) between 1-4%, and for CNT1 (0.2%) between 1-4%, for the reported ages.

Cement CPC 40 RS Cemex
f'c=34.3 MPa
ratio w/c=0.4
Cement in the mix=9.5 kg
Dosage=0.2% by weight of cement The results given in Tables 4, 5 and 6 show that for CNT1 (0.05%), the compressive strength increased between 6-8%, for CNT1 (0.1%) there was not increase before 7 days, and there was an increase at 7 days of 4%, for CNT1 (0.2%), between 2-4% for the reported ages.

Cement CPC 40 RS Cemex
f'c=34.3 MPa
ratio w/c=0.5
Cement in the mix=9.5 kg
Dosage=0.08% by weight of cement The results given in Tables 4, 5 and 6 show that for CNT1 (0.05%), the compressive strength increased between 1-5%, for CNT1 (0.1%) between 4-6% and for CNT1 (0.2%), between 3-9% for the reported ages.

Figure 5:
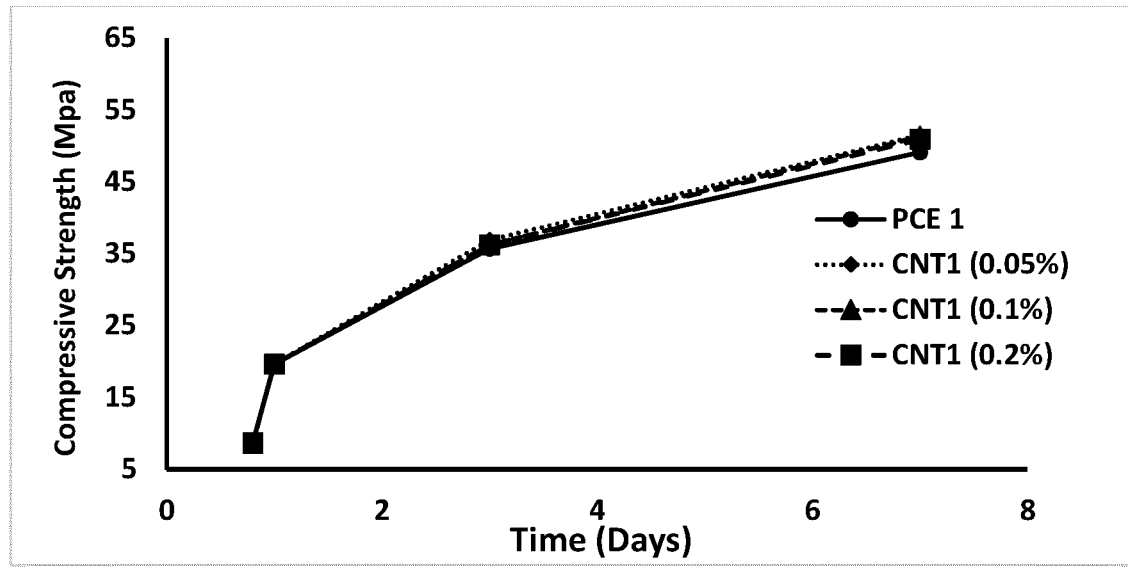
FIG. 5 is a graph showing the compressive strength development determined in Example 6 for Cemex cement at w/c=0.35.
Figure 6:
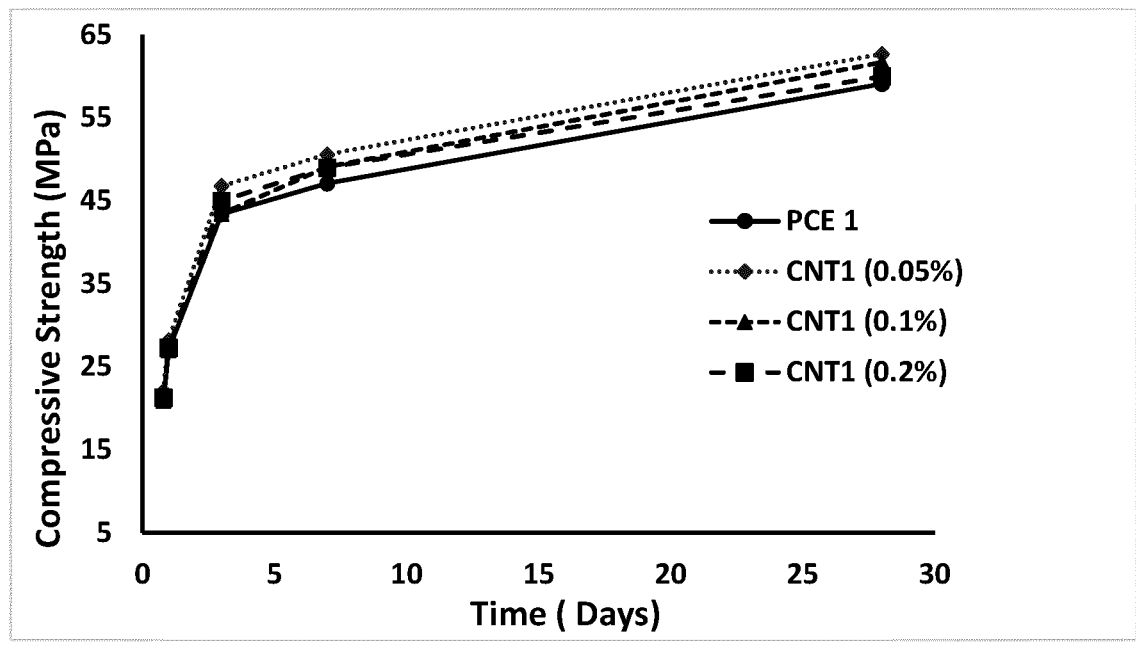
FIG. 6 is a graph showing the compressive strength development determined in Example 6 for Cemex cement at w/c=0.4.
Figure 7:
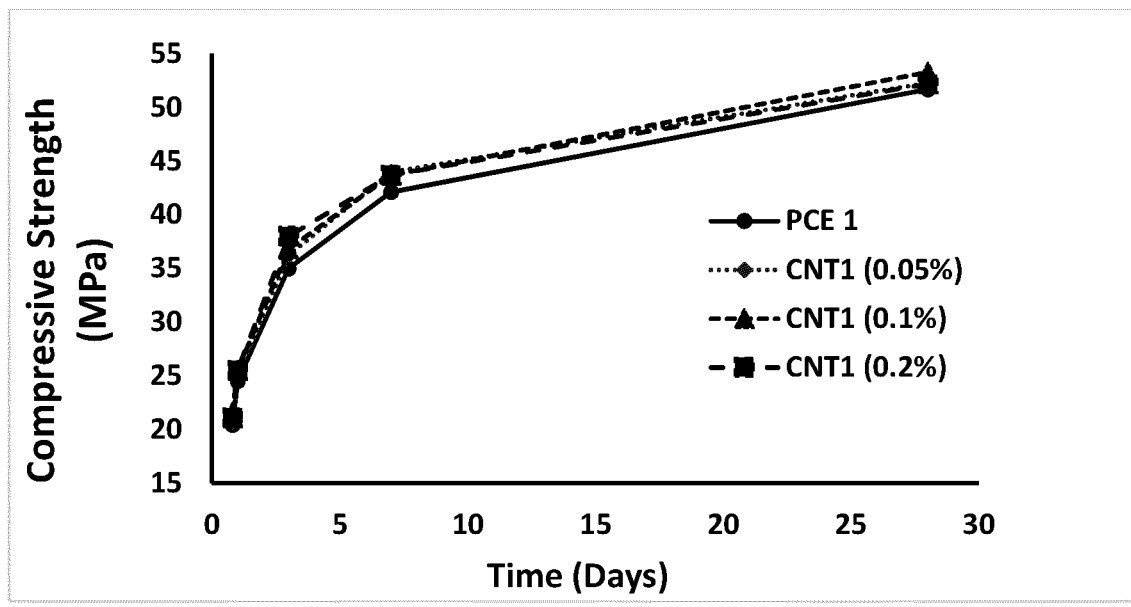
FIG. 7 is a graph showing the compressive strength development determined in Example 6 for Cemex cement at w/c=0.5.

The results for Cemex cement with w/c=0.35 is shown in FIG. 5. The results for Cemex cement with w/c=0.4 is shown in FIG. 6. The results for Cemex cement with w/c=0.5 is shown in FIG. 7.

B) Holcim Cement
Cement CPC 40 Holcim
f'c=34.3 MPa
ratio w/c=0.35
Cement in the mix=9.1 kg
Dosage=0.43% by weight of cement The results given in Tables 4, 5 and 6 show that for CNT1 (0.05%), the compressive strength increased between 1-8%, for CNT1 (0.1%) between 4-7% and for CNT1 (0.2%), between 10-11% for the reported ages.

Cement CPC 40 Holcim
f'c=34.3 MPa
ratio w/c=0.5
Cement in the mix=9.5 kg
Dosage=0.1% by weight of cement The details on the composition and the data measured are given in Table 1 (see also Tables 4, 5 and 6).

TABLE 1

| | | Name | | | |
|---|---|---|---|---|---|
| | | PCE 1 (Reference) | CNT1 (0.05%) | CNT1 (0.1%) | CNT1 (0.2%) |
| | | Dosage (%) | | | |
| Admixture | | 0.10 | 0.10 | 0.10 | 0.10 |
| Holcim CPC 40 Cement | kg | 9.50 | 9.50 | 9.50 | 9.50 |
| Water | kg | 4.81 | 4.81 | 4.81 | 4.81 |
| Andesite Sand | kg | 25.54 | 25.54 | 25.54 | 25.54 |
| Basalt Gravel 20 mm | kg | 22.86 | 22.86 | 22.86 | 22.86 |
| Testing at w/c | — | 0.50 | 0.50 | 0.50 | 0.50 |
| Testing at g/s | — | 0.90 | 0.90 | 0.90 | 0.90 |
| Setting Time | Initial | 05:25 | 05:55 | 06:00 | 06:10 |
| Dataloger | Final | 06:55 | 07:25 | 07:30 | 07:40 |
| Slump (cm) | Initial Slump Compression | 26.5-64.0 | 27.0-68.5 | 26.5-65.0 | 27.0-69.0 |
| Compressive Strength vs | 18 hrs (MPa) | 21.6 | 21.8 | 21.6 | 21.9 |
| | % | 100 | 100.9 | 100.0 | 101.4 |

TABLE 1-continued

|  |  | PCE 1 (Reference) | CNT1 (0.05%) | CNT1 (0.1%) | CNT1 (0.2%) |
|---|---|---|---|---|---|
|  |  | Name |  |  |  |
|  |  | Dosage (%) |  |  |  |
| Admixture |  | 0.10 | 0.10 | 0.10 | 0.10 |
| Reference (Megapascal) | Compression 1 days (MPa) | 26.1 | 26.2 | 26.2 | 26.1 |
|  | % | 100 | 100.38 | 100.38 | 100.00 |
|  | Compression 3 days (MPa) | 39.2 | 40.6 | 40 | 39.5 |
|  | % | 100 | 103.57 | 102.04 | 100.77 |
|  | Compression 7 days (MPa) | 46.2 | 46.8 | 46.7 | 46.4 |
|  | % | 100 | 101.30 | 101.08 | 100.43 |

The data given in Table 1 show that for CNT1 (0.05%) there was an increase between 1-4%, for CNT1 (0.1%), between 1-2% and for CNT1 (0.2%) between 0.4-0.8% for the reported ages.

Figure 8:
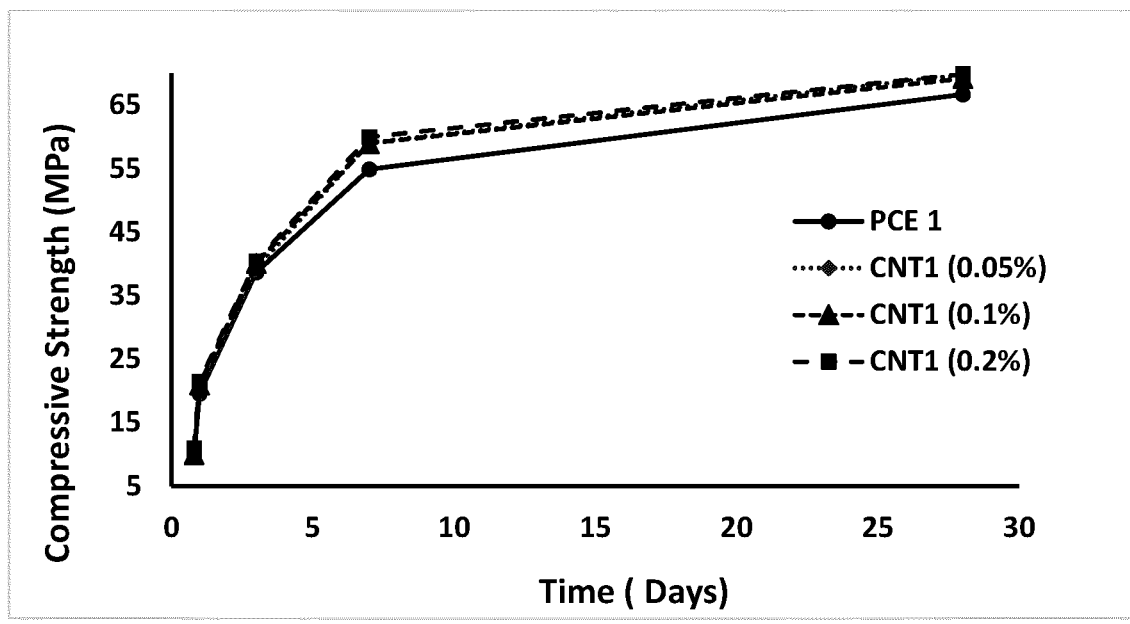
FIG. 8 is a graph showing the compressive strength development determined in Example 6 for Holcim cement at w/c=0.35.
Figure 9:
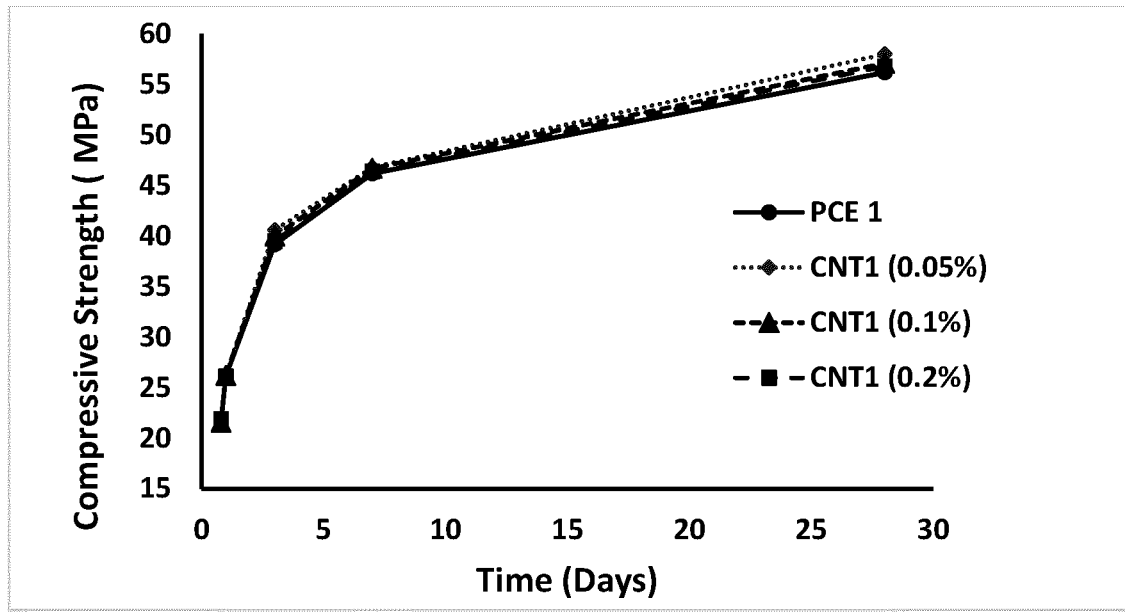
FIG. 9 is a graph showing the compressive strength development determined in Example 6 for Holcim cement at w/c=0.5.

The results for Holcim cement with w/c=0.35 is shown in FIG. 8. The results for Holcim cement with w/c=0.5 is shown in FIG. 9.

C) Moctezuma Cement
Cement CPC 40 RS Moctezuma
f'c=34.3 MPa
ratio w/c=0.35
Cement in the mix=9.5
Dosage=0.2% by weight of cement
The results are shown in Tables 4, 5 and 6 below.
Cement CPC 40 RS Moctezuma
f'c=34.3 MPa
ratio w/c=0.4
Cement in the mix=9.5 kg
Dosage=0.2% by weight of cement
The details on the composition and the data measured are given in Table 2 (see also Tables 4, 5 and 6).

TABLE 2

|  |  |  | PCE 1 (Reference) | CNT1 (0.05%) | CNT1 (0.1%) | CNT1 (0.2%) |
|---|---|---|---|---|---|---|
|  |  |  | Name |  |  |  |
|  |  |  | Dosage (%) |  |  |  |
| Admixture |  |  | 0.20 | 0.20 | 0.20 | 0.20 |
| Moctezuma CPC 40RS | kg |  | 9.50 | 9.50 | 9.50 | 9.50 |
| Water | kg |  | 4.00 | 4.00 | 4.00 | 4.00 |
| Andesita Sand | kg |  | 26.28 | 26.28 | 26.28 | 26.28 |
| Basalt Gravel 20 mm | kg |  | 23.52 | 23.52 | 23.52 | 23.52 |
| Testing at w/c | — |  | 0.40 | 0.40 | 0.40 | 0.40 |
| Testing at g/s | — |  | 0.90 | 0.90 | 0.90 | 0.90 |
| Setting Time Dataloger | Initial |  | 10:15 | 10:05 | 10:45 | 11:15 |
|  | Final |  | 11:45 | 11:35 | 12:15 | 12:45 |
| Slump (cm) | Initial Slump |  | 26.0-66.0 | 25.5-62.0 | 24.5-60.5 | 25.5-62.0 |
| Compressive Strength vs Reference (Megapascals) | Compression 18 hrs (MPa) |  | 16.6 | 16.6 | 20.4 | 17.7 |
|  | % |  | 100 | 100.00 | 122.89 | 106.63 |
|  | Compression 1 days (MPa) |  | 24.9 | 24.9 | 28.6 | 26.6 |
|  | % |  | 100 | 100.00 | 114.86 | 106.83 |
|  | Compression 3 days (MPa) |  | 45.1 | 47 | 51 | 47.6 |
|  | % |  | 100 | 104.21 | 113.08 | 105.54 |
|  | Compression 7 days (MPa) |  | 50.4 | 52.7 | 56.2 | 54 |
|  | % |  | 100 | 104.56 | 111.51 | 107.14 |

The data given in Table 2 show that for CNT1 (0.05%) there was an increase between 4-5%, for CNT1 (0.1%), between 12-23% and for CNT1 (0.2%) between 6-7% for the reported ages.

Cement CPC 40 RS Moctezuma
fc=34.3 MPa
ratio w/c=0.5
Cement in the mix=9.5 kg
Dosage=0.09% by weight of cement The details on the composition and the data measured are given in Table 3 (see also Tables 4, 5 and 6 below).

TABLE 3

| | | Name | | | |
|---|---|---|---|---|---|
| | | PCE 1 (Reference) | CNT1 (0.05%) | CNT1 (0.1%) | CNT1 (0.2%) |
| | | Dosage (%) | | | |
| Admixture | | 0.09 | 0.09 | 0.09 | 0.09 |
| Moctezuma CPC 40RS Cement | kg | 9.50 | 9.50 | 9.50 | 9.50 |
| Water | kg | 4.85 | 4.85 | 4.85 | 4.85 |
| Andesite sand | kg | 25.54 | 25.54 | 25.54 | 25.54 |
| Basalt Gravel 20 mm | kg | 22.82 | 22.82 | 22.82 | 22.82 |
| Testing at w/c | — | 0.50 | 0.50 | 0.50 | 0.50 |
| Testing at g/s | — | 0.90 | 0.90 | 0.90 | 0.90 |
| Setting Time Dataloger | Initial | 07:00 | 06:45 | 07:15 | 07:30 |
| | Final | 08:30 | 08:15 | 08:45 | 09:00 |
| Slump (cm) | Initial Slump | 26.5-68.0 | 26.5-69.0 | 27.0-70.0 | 27.0-70.0 |
| Compressive Strength vs Reference (Megapascal) | Compression 18 hrs (MPa) | 17.6 | 18.8 | 18.9 | 19.1 |
| | % | 100 | 106.82 | 107.39 | 108.52 |
| | Compression 1 days (MPa) | 23.3 | 23.5 | 24.2 | 24.2 |
| | % | 100 | 100.86 | 103.86 | 103.86 |
| | Compression 3 days (MPa) | 33.6 | 34.2 | 34.1 | 34.5 |
| | % | 100 | 101.79 | 101.49 | 102.68 |
| | Compression 7 days (MPa) | 43.9 | 46 | 45.6 | 45.4 |
| | % | 100 | 104.78 | 103.87 | 103.42 |

The data given in Table 3 show that for CNT1 (0.05%) there was an increase between 2-7%, for CNT1 (0.1%), between 1-7% and for CNT1 (0.2%) between 3-9% for the reported ages.

Figure 10:
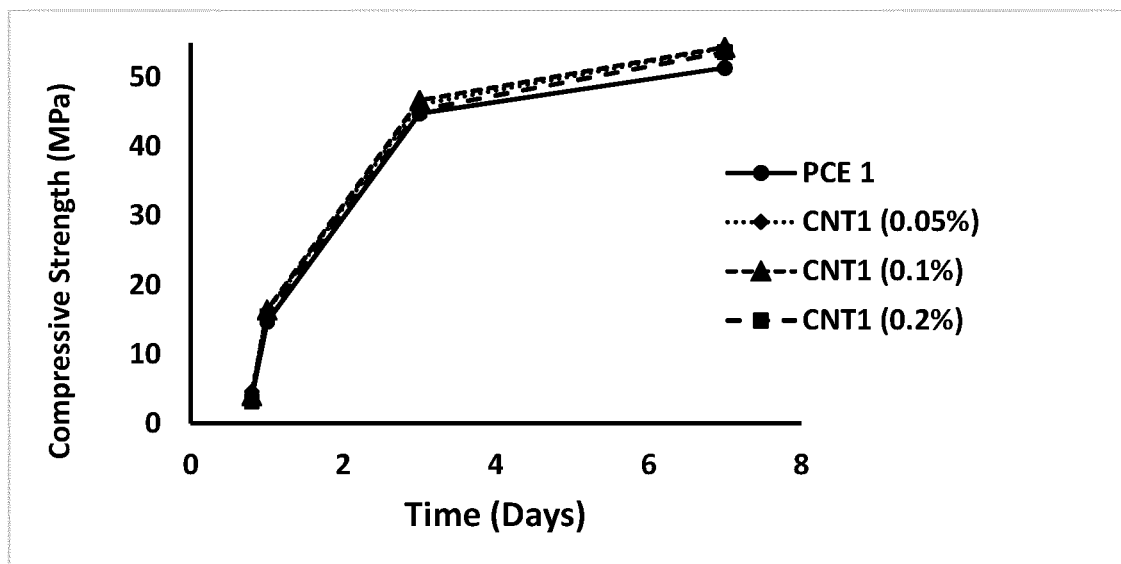
FIG. 10 is a graph showing the compressive strength development determined in Example 6 for Moctezuma cement at w/c=0.35.
Figure 11:
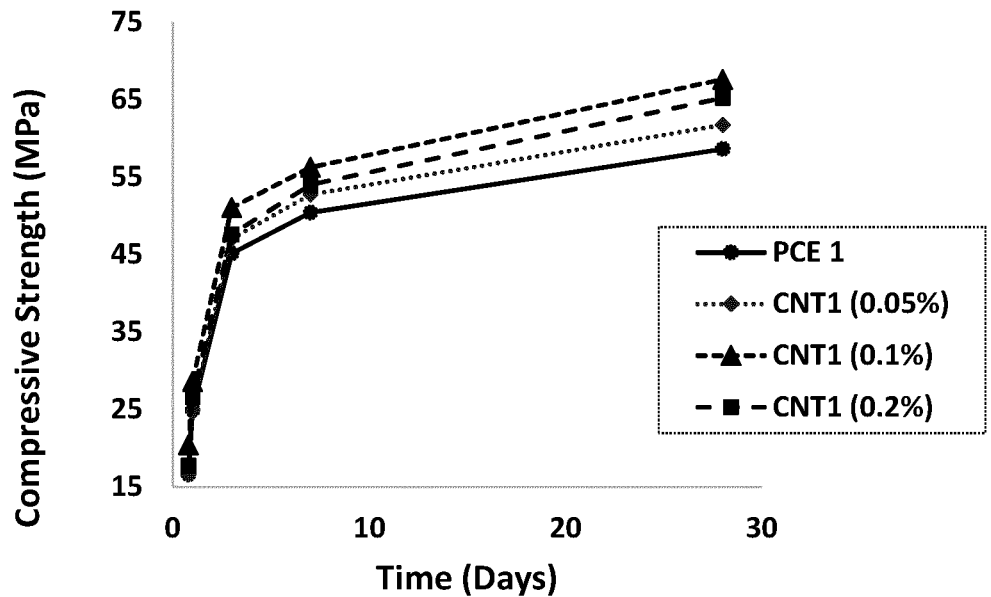
FIG. 11 is a graph showing the compressive strength development determined in Example 6 for Moctezuma cement at w/c=0.4.
Figure 12:
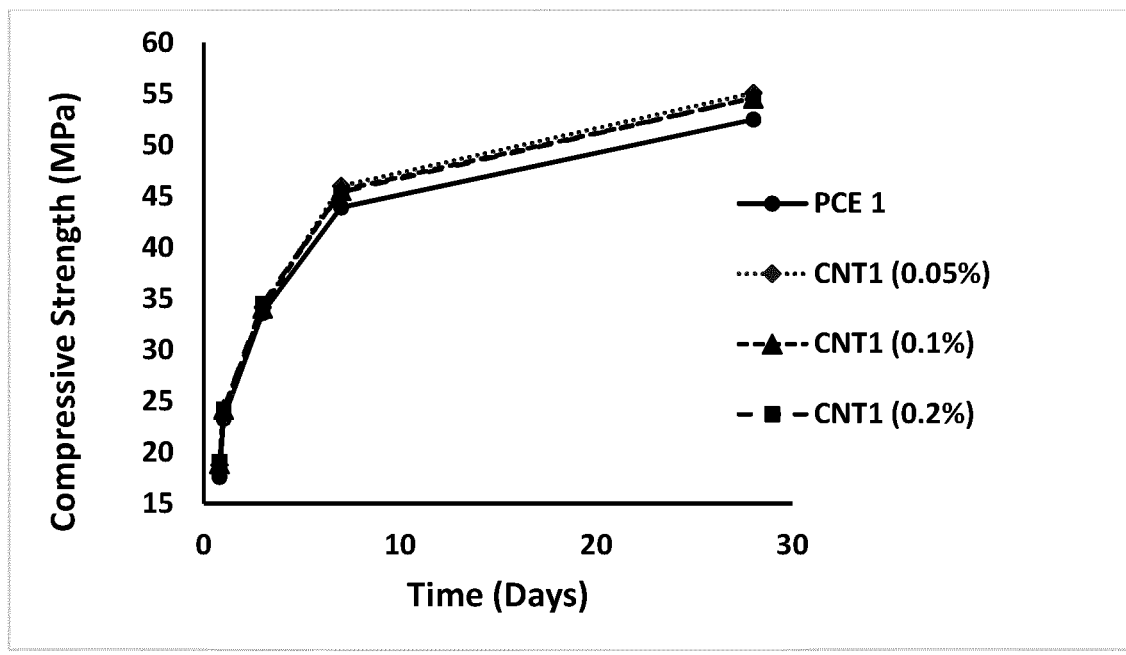
FIG. 12 is a graph showing the compressive strength development determined in Example 6 for Moctezuma cement at w/c=0.5.

The results for Moctezuma cement with w/c=0.35 is shown in FIG. 10. The results for Moctezuma cement with w/c=0.4 is shown in FIG. 11. The results for Moctezuma cement with w/c=0.5 is shown in FIG. 12.

Summary

In summary, addition of the functionalized carbon nanotubes results in an increase in compressive strength in concrete testing as summarized in the following Tables 4, 5 and 6:

TABLE 4 for 0.05% of CNT

| Cement | Compressive Strength Increase vs Reference (%) age(days) | | | |
|---|---|---|---|---|
| | 0.75 | 1 | 3 | 7 |
| w/c = 0.35 Admix dosage of 0.4% by weight of cement | | | | |
| Cemex | 0 | 0.3 | 3.4 | 4.9 |
| Holcim | 0 | 1.0 | 1.3 | 7.7 |
| Moctezuma | 23.7 | 10 | 2.8 | 6 |
| w/c = 0.4 Admix dosage of 0.2% by weight of cement | | | | |
| Cemex | 5.7 | 4.4 | 7.8 | 7.4 |
| Moctezuma | 0 | 0 | 4.2 | 4.6 |
| w/c = 0.5 Admix dosage of 0.1% by weight of cement | | | | |
| Cemex | 1.5 | 1.6 | 3.4 | 4.5 |
| Holcim | 0.9 | 0.4 | 3.6 | 1.3 |
| Moctezuma | 6.8 | 0.9 | 1.8 | 4.8 |

TABLE 5 for 0.1% of CNT

| Cement | Compressive Strength Increase vs Reference (%) age(days) | | | |
|---|---|---|---|---|
| | 0.75 | 1 | 3 | 7 |
| w/c = 0.35 Admix dosage of 0.4% by weight of cement | | | | |
| Cemex | 0.23 | 0.1 | 1.4 | 4.5 |
| Holcim | 1 | 7.1 | 3.6 | 7.5 |
| Moctezuma | 7.9 | 11.3 | 4.2 | 6 |
| w/c = 0.4 Admix dosage of 0.2% by weight of cement | | | | |
| Cemex | 0 | 0.0 | 0.1 | 4.3 |
| Moctezuma | 22.9 | 14.9 | 13.1 | 11.5 |
| w/c = 0.5 Admix dosage of 0.1% by weight of cement | | | | |
| Cemex | 5.9 | 4.1 | 5.1 | 3.8 |
| Holcim | 0 | 0.4 | 2.0 | 1.1 |
| Moctezuma | 7.4 | 3.9 | 1.5 | 3.9 |

TABLE 6 for 0.2% of CNT

| Cement | Compressive Strength Increase vs Reference (%) age(days) | | | |
|---|---|---|---|---|
| | 0.75 | 1 | 3 | 7 |
| w/c = 0.35 Admix dosage of 0.4% by weight of cement | | | | |
| Cemex | 0.5 | 0.0 | 1.4 | 3.7 |
| Holcim | 11.1 | 9.7 | 4.4 | 9.3 |
| Moctezuma | 0 | 5.3 | 1.1 | 5 |
| w/c = 0.4 Admix dosage of 0.2% by weight of cement | | | | |
| Cemex | 1.9 | 1.1 | 3.7 | 4.0 |
| Moctezuma | 6.6 | 6.8 | 5.5 | 7.1 |
| w/c = 0.5 Admix dosage of 0.1% by weight of cement | | | | |
| Cemex | 3.4 | 4.1 | 8.6 | 3.8 |
| Holcim | 1.4 | 0.0 | 0.8 | 0.4 |
| Moctezuma | 8.5 | 3.9 | 2.7 | 3.4 |

For Cemex the best results were found for a w/c ratio of 0.5 with the admixture containing 0.2% of CNT1, increase of compressive strength of 3-9% and a dosage of 0.08% by weight of cement. For Holcim the best results were found for a w/c ratio of 0.35 with the admixture containing 0.2% of CNT1 and a dosage of 0.43% by weight of cement, increase of compressive strength of 6-8%. For Moctezuma the best results were found for a w/c ratio of 0.4 with the admixture containing 0.1% of CNT1 and a dosage of 0.2% by weight of cement, increase of compressive strength of 12-23%.

Compared to previous tests with Cruz Azul, where the w/c ratio used was 0.5, admixture containing 0.1% of CNT1 and the required dosage was 0.09% by weight of cement, with increase of compressive strength of 6-8%, Cemex and Moctezuma showed a similar behavior. However, Holcim showed less percentage of increase at early age, this can be explained with the increase on setting times by at least 30 minutes in comparison to the reference.

The invention claimed is:

1. A cement based composition, comprising cement and 0.01 to 1.5% by weight, based on a weight of the cement, of an admixture, the admixture comprising:
   a) an aqueous solution of polycarboxylate ether, a proportion of the polycarboxylate ether being in a range of 10 to 70% by weight, based on a total weight of the admixture, and
   b) at least one functionalized nanomaterial selected from carbon nanotubes functionalized by carboxyl groups and/or carbon nanofibers functionalized by carboxyl groups, wherein the at least one functionalized nanomaterial is dispersed in the aqueous solution, wherein a proportion of the at least one functionalized nanomaterial is in a range of 0.04 to 0.4% by weight, based on the total weight of the admixture.

2. The cement based composition according to claim 1, wherein the proportion of the at least one functionalized nanomaterial is in the range of 0.00001 to 0.05% by weight, based on the weight of the cement.

3. The cement based composition according to claim 1, wherein the cement based composition is a concrete, a mortar or a grouting material.

4. A method of forming the cement based composition according to claim 1, the method comprising
   introducing the admixture into a cement based composition as a compressive strength enhancer.

5. A shaped body obtainable by curing the cement based composition according to claim 1.

6. The cement based composition according to claim 1, wherein the carbon nanotubes functionalized by carboxyl groups have a diameter in a range of 10 to 90 nm and/or the carbon nanofibers functionalized by carboxyl groups have a diameter in the range of 50 to 200 nm.

7. The cement based composition according to claim 1, wherein the carbon nanotubes functionalized by carboxyl groups and/or the carbon nanofibers functionalized by carboxyl groups have an aspect ratio in a range of from 5 to 750.

8. The cement based composition according to claim 1, wherein the carbon nanotubes functionalized by carboxyl groups or the carbon nanofibers functionalized by carboxyl groups are obtained by oxidative treatment of the carbon nanotubes or the carbon nanofibers.

9. The cement based composition according to claim 1, wherein the polycarboxylate ether comprises:
   a) a partial structural unit S1 of formula (I) in a mole fraction of a

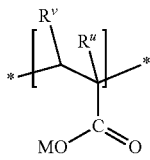
(I)

b) a partial structural unit S2 of formula (II) in a mole fraction of b

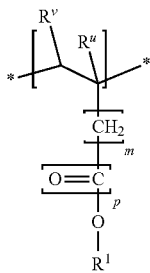
(II)

where:

M independently from each other is H$^+$, an alkali metal ion, alkaline earth metal ion, a di- or trivalent metal ion, an ammonium ion or an organic ammonium group;

each R$^u$ independent from the others is hydrogen or a methyl group, each R$^v$ is hydrogen, m=1 or 2, p=0 or 1, and R$^1$ is -[AO]$_n$—H, wherein A is a C$_2$ to C$_4$-alkylene, and n is from 20 to 150, and the molar ratio a/b of the mole fraction a of the partial structural unit S1 to the mole fraction b of the partial structural unit S2 is in a range from 6/1 to 2.5/1, provided that a+b=1.

10. The cement based composition according to claim 9, wherein M is H$^+$ or Na$^+$.

11. The cement based composition according to claim 1, wherein the admixture essentially consists of the aqueous solution of polycarboxylate ether and the at least one functionalized nanomaterial or wherein the admixture further comprises at least one additive selected from plasticizers or superplasticizers other than polycarboxylate ethers, strength enhancers, retarders, accelerators, air entrainers, defoamers, corrosion inhibitors, expansion producing agents, pigments, fibres, waterproofing additives, biocides, thickeners and alkali-aggregate reaction inhibitors.

12. The cement based composition according to claim 1, wherein the proportion of the polycarboxylate ether is in a range of 10 to 65% by weight based on the total weight of the admixture.

13. The cement based composition according to claim 1, wherein the proportion of the polycarboxylate ether is in a range of 10 to 60% by weight based on the total weight of the admixture.

14. The cement based composition according to claim 1, wherein a weight ratio of the polycarboxylate ether to the at least one functionalized nanomaterial is in a range of from 25:1 to 1,750:1.

* * * * *